(12) United States Patent
Hoch et al.

(10) Patent No.: US 11,543,502 B2
(45) Date of Patent: Jan. 3, 2023

(54) OPERATING LIGHT SOURCES TO PROJECT PATTERNS FOR DISORIENTING VISUAL DETECTION SYSTEMS

(71) Applicant: NEC Corporation Of America, Herzlia (IL)

(72) Inventors: Yaacov Hoch, Ramat-Gan (IL); Tsvi Lev, Tel-Aviv (IL)

(73) Assignee: NEC Corporation Of America, Herzlia (IL)

( * ) Notice: Subject to any disclaimer, the term of this patent is extended or adjusted under 35 U.S.C. 154(b) by 785 days.

(21) Appl. No.: 16/519,015

(22) Filed: Jul. 23, 2019

(65) Prior Publication Data
US 2021/0025679 A1    Jan. 28, 2021

(51) Int. Cl.
| | | |
|---|---|---|
| G01S 7/495 | (2006.01) | |
| F41H 13/00 | (2006.01) | |
| G03B 15/02 | (2021.01) | |
| G06T 7/246 | (2017.01) | |
| H04K 3/00 | (2006.01) | |
| G06N 20/00 | (2019.01) | |
| G06K 9/00 | (2022.01) | |
| F41H 3/00 | (2006.01) | |

(52) U.S. Cl.
CPC .......... *G01S 7/495* (2013.01); *F41H 13/0087* (2013.01); *G03B 15/02* (2013.01); *G06T 7/251* (2017.01); *H04K 3/62* (2013.01); *H04K 3/825* (2013.01); *F41H 3/00* (2013.01); *G06K 9/00496* (2013.01); *G06N 20/00* (2019.01); *G06T 2207/20081* (2013.01); *G06T 2207/30212* (2013.01); *H04K 2203/24* (2013.01)

(58) Field of Classification Search
CPC ........ G01S 7/495; G01S 7/38; F41H 13/0087; F41H 3/00; G03B 15/02; G06T 7/251; G06T 2207/20081; G06T 2207/30212; H04K 3/62; H04K 3/825; H04K 2203/24; H04K 3/82; G06K 9/00496; G06N 20/00
See application file for complete search history.

(56) References Cited

U.S. PATENT DOCUMENTS

2009/0284957 A1* 11/2009 Shemwell ............... F41H 13/00
362/109
2017/0131067 A1* 5/2017 Boland ............... F41H 13/0043

* cited by examiner

*Primary Examiner* — Christopher M Brandt

(57) ABSTRACT

Methods and systems fort operating one or more light sources to project adversarial patterns generated to disorient a machine learning based detection system, comprising generating one or more adversarial patterns configured to disorient the machine learning based detection system and operating one or more light sources configured to project one or more of the adversarial pattern(s) in association with the targeted object in order to disorient the machine learning based detection system.

8 Claims, 7 Drawing Sheets

OPERATING LIGHT SOURCES TO PROJECT PATTERNS FOR DISORIENTING VISUAL DETECTION SYSTEMS

FIELD AND BACKGROUND OF THE INVENTION

The present invention, in some embodiments thereof, relates to operating light sources to project adversarial patterns, and, more specifically, but not exclusively, to operating light sources to project adversarial patterns configured to disorient machine learning based detection systems.

Machine learning is one of the most rapidly evolving technologies in current times. Machine learning models, algorithms and methodologies, for example, neural networks, Support Vector Machines (SVM) and/or the like are applied for a plurality of applications in particular for detecting patterns in a plurality of datasets.

The machine learning models may be trained with training samples through supervised, semi-supervised and/or unsupervised learning to adjust their internal nodes, edges, weights and/or the like to cluster, classify and/or estimate identity, type and/or group of objects portrayed in the training samples.

A major field in which machine learning is deployed is visual detection and identification which spans across a plurality of applications and uses ranging from face recognition to autonomous vehicles control. Such machine learning models may naturally be trained with image training samples to adjust according to extracted features relating to an appearance of the objects depicted in the training samples, for example, a shape, an outline, a texture, a color, a complexion and/or the like.

SUMMARY OF THE INVENTION

According to a first aspect of the present invention there is provided a method of operating one or more light sources to project adversarial patterns generated to disorient a machine learning based detection system, comprising using one or more processors associated with an object targeted by the machine learning based detection system. One or more of the processor(s) are used for:
  Generating one or more adversarial patterns configured to disorient the machine learning based detection system.
  Operating the one or more light sources configured to project one or more of the adversarial pattern(s) in association with the targeted object in order to disorient the machine learning based detection system.

According to a second aspect of the present invention there is provided a system for operating one or more light sources to project adversarial patterns generated to disorient a machine learning based detection system, comprising one or more light sources configured to project a pattern in association with an object targeted by the machine learning based detection system and one or more processor associated with the object and coupled to the light source(s). One or more of the processor(s) are adapted to execute a code, the code comprising:
  Code instructions to generate one or more adversarial patterns configured to disorient the machine learning based detection system.
  Code instructions to operate one or more of the light sources to project one or more of the adversarial pattern(s) in association with the object in order to disorient the machine learning based detection system targeting the object.

According to a third aspect of the present invention there is provided a method of operating one or more light sources to project patterns generated to enhance detection of objects by a machine learning based detection system, comprising:
  Generating one or more patterns configured to enhance recognition of an object by the machine learning based detection system.
  Operating one or more light sources associated with the targeted object to project one or more of the pattern(s) in association with the object in order to enhance detection of the object by the machine learning based detection system.

According to a fourth aspect of the present invention there is provided a system for operating one or more light sources to project patterns generated to enhance detection of objects by a machine learning based detection system, comprising one or more light sources configured to project patterns in association with an object detected by the machine learning based detection system and one or more processor associated with the object and coupled to the one or more light sources. One or more of the processor(s) is adapted to execute a code. The code comprising:
  Code instructions to generate one or more pattern configured to enhance recognition of an object by the machine learning based detection system.
  Code instructions to operate the one or more light sources to project one or more of the pattern(s) in association with the object in order to enhance detection of the object by the machine learning based detection system.

According to a fifth aspect of the present invention there is provided a method of operating one or more light sources to project dynamic patterns generated to prevent a camera from focusing on objects, comprising using one or more processors associated with an object which the camera attempts to capture. One or more of the processor(s) are used for:
  Generating one or more dynamic patterns configured to dynamically alter one or more focal points of the pattern.
  Operating one or more light sources to project one or more of the dynamic pattern(s) in association with the object in order to disorient one or more autofocus algorithms of the camera thus preventing the camera from focusing on the object.

According to a sixth aspect of the present invention there is provided a system for operating one or more light sources to project dynamic patterns generated to prevent a camera from focusing on objects, comprising one or more light sources associated with an object and one or more processors coupled to the one or more light source. One or more of the processor(s) are adapted to execute a code. The code comprising:
  Code instructions to generate one or more dynamic pattern having a dynamically altered focal point.
  Code instructions to operate the one or more light to project the one or more dynamic pattern in association with the object in order to disorient one or more autofocus algorithm of the camera thus preventing the camera from focusing on the object.

In a further implementation form of the first, second, third, fourth, fifth and/or sixth aspects, the one or more light sources include a plurality of distinct spot light sources distributed over the targeted object.

In a further implementation form of the first, second, third, fourth, fifth and/or sixth aspects, the one or more light sources include a screen.

In a further implementation form of the first, second, third, fourth, fifth and/or sixth aspects, the one or more light sources include a hologram projector.

In a further implementation form of the first, second, third, fourth, fifth and/or sixth aspects, one or more of the light source(s) are mounted on the object.

In a further implementation form of the first, second, third, fourth, fifth and/or sixth aspects, the object is a member of a group consisting of: a person, a ground vehicle, an aerial vehicle, a naval vehicle and/or a structure.

In a further implementation form of the first and/or second aspects, the machine learning based detection system is a machine learning based acquisition system of an incoming weapon projectile targeting the object. One or more of the adversarial pattern(s) are configured to disorient the machine learning based acquisition system in order to prevent the incoming weapon projectile from locking on the targeted object.

In a further implementation form of the first and/or second aspects, the machine learning based detection system is a machine learning based face recognition system attempting to identify a face of a human object. One or more of the adversarial pattern(s) are configured to disorient the machine learning based face recognition system in order to prevent identification of the human object.

In a further implementation form of the third and/or fourth aspects, the machine learning based detection system is mounted on a vehicle and configured to detect objects in an environment of the vehicle.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
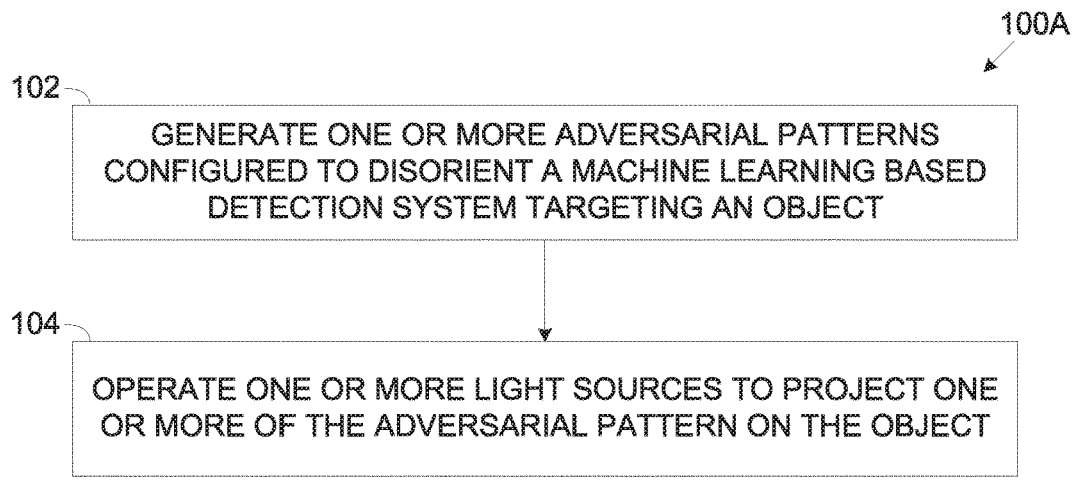
FIG. 1A is a flowchart of an exemplary process of operating one or more light sources to project adversarial patterns generated to disorient machine learning based visual detection systems, according to some embodiments of the present invention.

The present invention, in some embodiments thereof, relates to operating light sources to project adversarial patterns, and, more specifically, but not exclusively, to operating light sources to project adversarial patterns configured to disorient machine learning based detection systems.

According to some embodiments of the present invention, there are provided methods, systems and computer program products for generating and projecting adversarial patterns configured to disorient machine learning based detection systems in order to prevent detection and/or identification of one or more objects targeted by the machine learning based detection systems. The type, group and category of the objects may be highly diverse and versatile comprising a wide range of objects, for example, persons (humans), animals, vehicles, structures, faces, road infrastructure objects and/or the like.

The adversarial patterns generated as known in the art may be projected by one or more light sources, for example, a multitude of distinct spot light sources, a screen, a projector and/or the like in association with one or more objects, for example, on, around, in front, behind, to a side of one or more objects associated with the light sources. The adversarial pattern(s) projected in association with the associated object(s) may disorient one or more of the machine learning models, for example, a neural network, an SVM and/or the like employed by the detection system(s) and trained to detect the associated object(s).

Generating and projecting the adversarial patterns may present significant advantages and benefits for a plurality of applications and use cases. For example, generating the adversarial patterns may be highly suitable for defense systems deployed to protect objects, in particular military objects, for example, soldiers, military vehicles (e.g. ground, aerial and/or naval vehicle), military structures and/or the like against weapons employing machine learning based detection and/or acquisition systems. For example, one or more currently existing projectile weapons, for example, guided missiles, rockets, shells and/or the like may employ the machine learning based detection and/or acquisition systems trained to detect, identify and target one or more of military objects. A pattern generation system may be associated with one or more of the target military objects and may be configured to generate adversarial pattern(s) configured to obscure a shape and/or appearance of the associated military object(s). The adversarial pattern(s) may be projected by one or more of the light sources on the associated military object(s) to prevent the machine learning models of the detection and/or acquisition systems of one or more incoming projectile weapons from detecting, identifying and/or acquiring the obscured associated military object(s).

In another example, the generated adversarial patterns may be highly suitable to enhance and/or completely enforce privacy of people who may be subject to detection by one or more surveillance, detection and/or tracking systems. A pattern generation system may be associated with one or more persons (people) and may be configured to generate adversarial pattern(s) configured to obscure a shape and/or appearance of the person(s), for example, a face, a figure, a complexion, clothing and/or the like. The adversarial pattern(s) may be projected by one or more of the light sources on the person to prevent the machine learning models of the surveillance, detection and/or tracking systems from detecting and/or identifying the person(s) thus preventing violation of the privacy of the person(s).

According to some embodiments of the present invention, there are provided methods, systems and computer program products for generating and projecting (support) patterns configured to enhance detection of the associated object(s) by one or more of the machine learning based detection systems. The patterns may be projected by one or more of the light sources to increase probability of detection of the associated object(s) by the machine learning model(s) employed by the detection systems.

Generating the support patterns may be highly suitable to improve detection and/or increase probability of detection of the associated object(s) by one or more visual detection systems employing machine learning model(s), for example, an autonomous vehicle and/or a partially autonomous vehicle. In some scenarios, for example, under limited visibility conditions, during high-speed drive and/or the like, the machine learning based detection system(s) of the at least partially autonomous vehicle may fail, or present low probability, to detect and/or identify one or more objects located in the environment of the vehicle, for example, a pedestrian, a bicycle rider, a motorcycle and/or the like. Therefore generating one or more support patterns and projecting them on the associated object(s) may significantly increase probability of correct detection of the associated object(s) by the machine learning model(s) employed by the vehicle's detection system(s).

According to some embodiments of the present invention, there are provided methods, systems and computer program products for generating and projecting dynamic patterns configured to have one or more constantly changing focal points (changing depth). The dynamic patterns may be projected by one or more of the light sources in association with the associated object(s) to prevent one or more autofocus algorithms of cameras from focusing on the associated object(s) and thus prevent the camera(s) from capturing clear, sharp, coherent and/or quality images of the associated object(s).

Employing the pattern generation to generate the dynamic pattern(s) having the constantly changing focal point(s) may also serve to enhance the privacy of persons who may be a subject for image capturing, for example, camera(s) of the surveillance, detection and/or tracking systems, cameras operated by paparazzi photographers and/or the like. A pattern generation system associated with one or more persons (e.g. celebrities) may be configured to generate the dynamic pattern(s) configured to have a changing focal point (depth). The dynamic pattern(s) may be projected by one or more of the light sources on the person to prevent the auto-focus algorithm(s) of the camera(s) from focusing on the associated person(s) and thus prevent the camera(s) from capturing clear, sharp, coherent and/or quality images of the associated object(s)

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
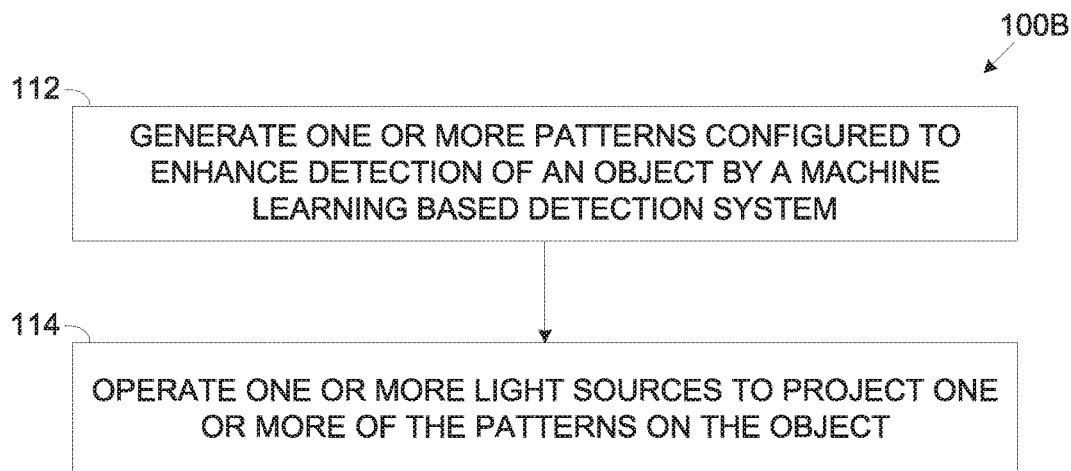
FIG. 1B is a flowchart of an exemplary process of operating one or more light sources to project patterns generated to enhance detection of objects by machine learning based visual detection systems, according to some embodiments of the present invention.
Figure 1C:
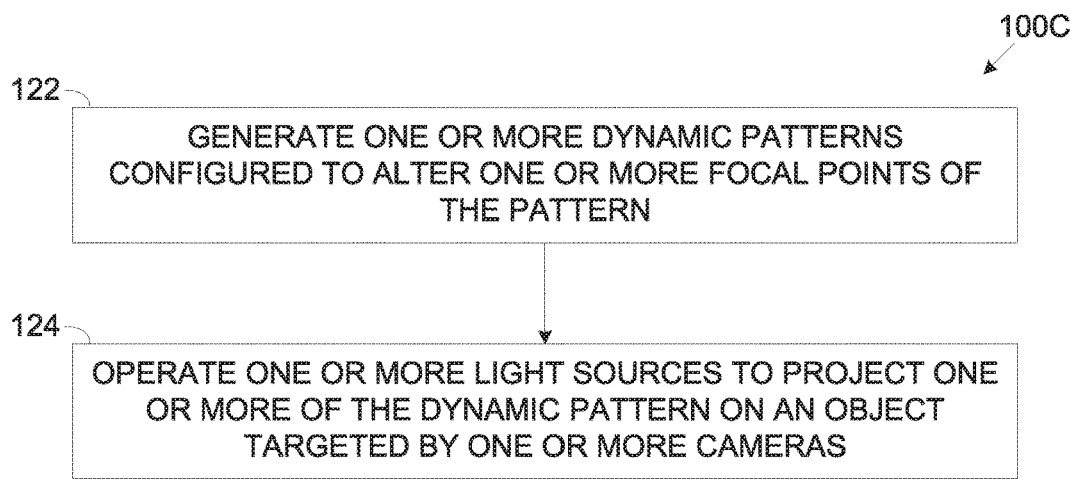
FIG. 1C is a flowchart of an exemplary process of operating one or more light sources to project dynamic patterns generated to prevent a camera from focusing on objects, according to some embodiments of the present invention.

Referring now to the drawings, FIG. 1A is a flowchart of an exemplary process of operating one or more light sources to project adversarial patterns generated to disorient machine learning based visual detection systems, according to some embodiments of the present invention. FIG. 1B is a flowchart of an exemplary process of operating one or more light sources to project patterns generated to enhance detection of objects by a machine learning based detection system, according to some embodiments of the present invention. FIG. 1C is flowchart of an exemplary process of operating one or more light sources to project dynamic patterns generated to prevent a camera from focusing on objects, according to some embodiments of the present invention.

An exemplary process 100A may be executed to generate one or more adversarial patterns which are configured, adapted and/or designed to disorient a detection system, in particular a visual detection system employing one or more machine learning models, algorithms and/or systems (collectively referenced models herein after) for detecting and/or acquiring one or more objects. Such machine learning models, for example, neural networks, SVMs and/or the like are typically trained to identify one or more objects.

The type of the objects may vary between the detection systems depending on the target application of the detection system and the training process applied to these detections systems. The objects may therefore comprise a wide range of objects, for example, a person (human), an animal, a vehicle, a structure, a face, a road infrastructure object and/or the like. Moreover, some of the machine learning models may be designed, configured, adapted and trained accordingly to detect general types of objects, for example, a person, a ground vehicle, a building and/or the like. However, some of the machine learning models may be designed, configured, adapted and trained accordingly to detect specific items of the object type, for example, a specific model of a vehicle, a specific person (e.g. face recognition), a specific animal and/or the like.

Training the machine learning model to detect and/or identify the object(s) may be done using one or more methods as known in the art, for example, supervised learning, semi-supervised learning, unsupervised learning and/or the like as known in the art. During the training, a plurality of training samples, for example, images which may be labeled or not are fed to the machine learning model which may adjust its internal nodes, edges, weights and/or the like to cluster, classify and/or estimate identity and/or type of the objects depicted in the training samples. The types, categories, groups and/o items of the objects presented to the machine learning model naturally depend on the target application of the detection system employing the trained machine learning model.

The process 100A may be executed to generate one or more adversarial patterns which are configured to disorient the machine learning model(s) of the detection system. The adversarial pattern(s) may be projected on, around, in front and/or in association with one or more objects thus preventing the detection system from detecting and/or acquiring the object(s), in particular object(s) which the machine learning model(s) is trained to detect and identify.

On the other hand, an exemplary process 100B may be executed to generate one or more patterns which are configured, adapted and/or designed to enhance detection and/or identification of one or more objects by the machine learning model(s) of the detection system. The generated patterns may be projected on, around, in front and/or in association with the object(s) thus increase the probability for the detection system to detect the object(s).

An exemplary process 100C may be executed to generate one or more dynamic patterns which are configured, adapted and/or designed to alter one or more focal points of the pattern(s). In particular, the dynamic patterns are configured to alter the focal points of the pattern(s) such that one or more auto-focus algorithms employed by one or more cameras are incapable of focusing on the dynamic pattern(s). The generated patterns may be projected on, around, in front and/or in association with the object(s) to prevent a camera from focusing on the object(s) thus preventing the camera from capturing clear, sharp, coherent and/or quality images of the object(s).

Figure 2:
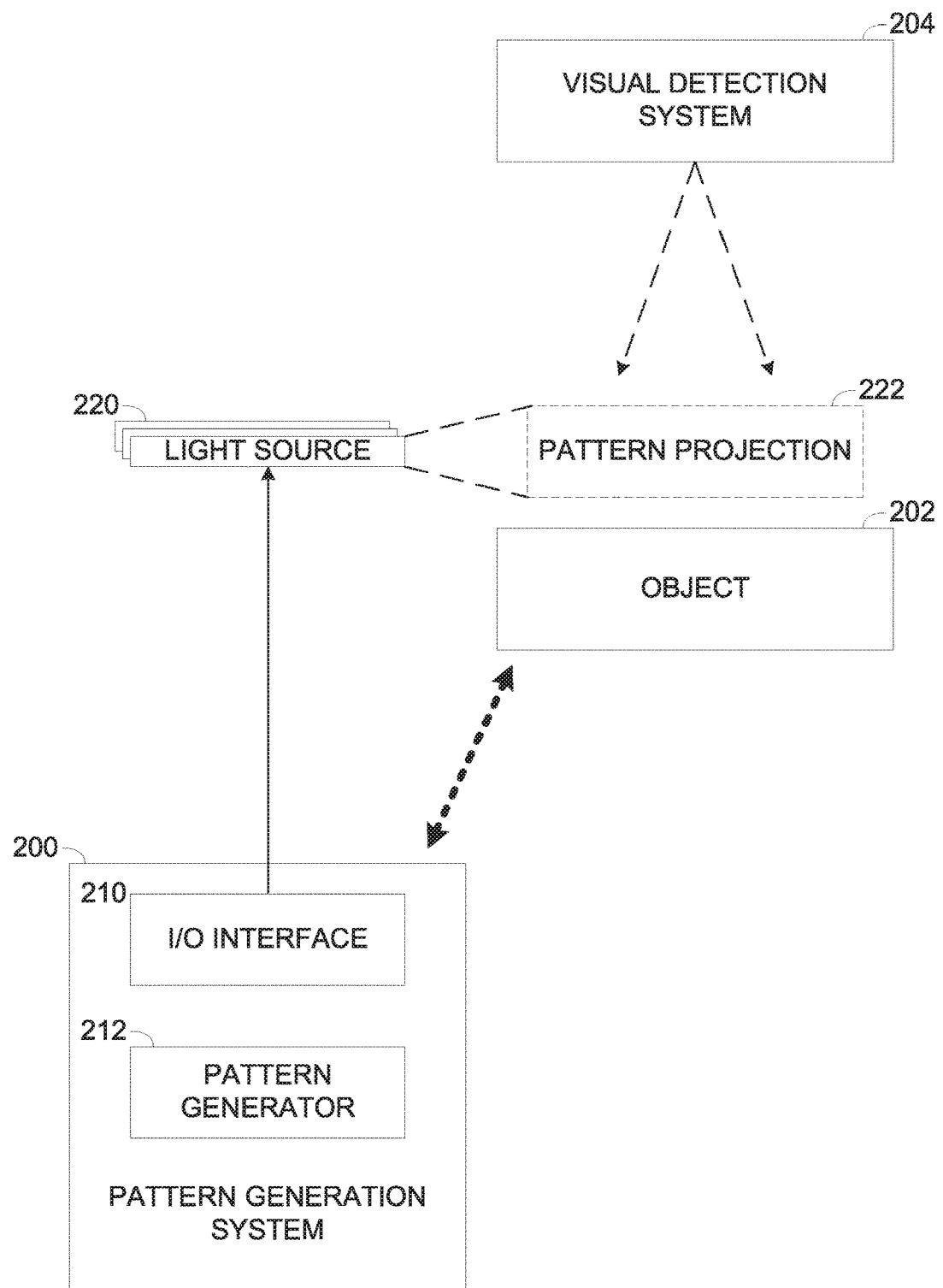
FIG. 2 is a schematic illustration of an exemplary system for operating one or more light sources to project patterns generated to manipulate perception of visual detection systems, according to some embodiments of the present invention.

Reference is also made to FIG. 2, which is a schematic illustration of an exemplary system for operating one or more light sources to project patterns generated to manipulate perception of visual detection systems, according to some embodiments of the present invention. An exemplary pattern generation system 200 may be used to execute one or more processes such as the process 100A, 100B and/or 100C.

The pattern generation system 200 which is associated with an object 202 may operate one or more light sources 220 to project one or more patterns 222 in association with the object 202, for example, on the object 202, around the object 202, in front of the object 202 and/or the like. The generated pattern(s) 222 are configured to manipulate perception of a visual detection system 204 which targets the object 202 in attempt to detect, acquire and/or identify the object 202.

The object 202 may comprise a dynamic and/or an inanimate object, for example, a person, an animal, a vehicle, a structure, a face, a road infrastructure object and/or the like. Moreover, the person object may refer to a civilian and/or a military person (in particular combat oriented military person) who may be distinguished by his uniform and/or gear. The vehicle object may include a ground vehicle (e.g. a car, a bicycle, a tank, a military troop's carrier, etc.), a naval vehicle (e.g. a boat, a ship, a submarine, etc.), an aerial vehicle (e.g. airplane, helicopter, etc.) and/or the like. The animal object may include, for example, a pet, a house stock animal, a wild animal and/or the like. The structure object may include, for example, a road, a land mark, a natural structure, a building, a shopping mall and/or the like. The road infrastructure object may include, for example, road markings, a traffic light, a traffic sign and/or the like.

The pattern generation system 200 may comprise an I/O interface 210 and a pattern generator 212. The I/O interface 210 may include one or more wired and/or wireless interfaces, for example, a Local area Network (LAN) interface, a Universal Serial Bus (USB) interface, a serial interface, a Radio Frequency (RF) interface, a Bluetooth interface, a Wireless LAN (WLAN) interface (e.g. Wi-Fi) and/or the like. Via the I/O interface 210, the flight path planning system 202 may communicate with one or more of the light source(s) 220 to operate the light source(s) 220 to project one or more patterns.

The pattern generation system 200 may include one or more processor(s), homogenous or heterogeneous, may include one or more processors arranged for parallel processing, as clusters and/or as one or more multi core processor(s). The pattern generation system 200 may further include a memory and/or a storage comprising one or more non-transitory persistent storage devices, for example, a hard drive, a Flash array and/or the like. The memory and/or storage may also include one or more volatile devices, for example, a Random Access Memory (RAM) component and/or the like. The processor(s) may execute one or more software modules such as, for example, a process, a script, an application, an agent, a utility, a tool and/or the like each comprising a plurality of program instructions stored in the non-transitory medium (program store) of the pattern generation system 200.

The pattern generation system 200 may also include one or more hardware elements, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU) and/or the like for executing one or more tasks, operations and/or actions.

The pattern generator 212 may be executed, implemented and/or utilized by one or more software modules, one or more of the hardware elements and/or a combination thereof.

Optionally, the pattern generation system 200, in particular, the pattern generator 212 may be integrated with one or more of the light sources 220.

Figure 3:
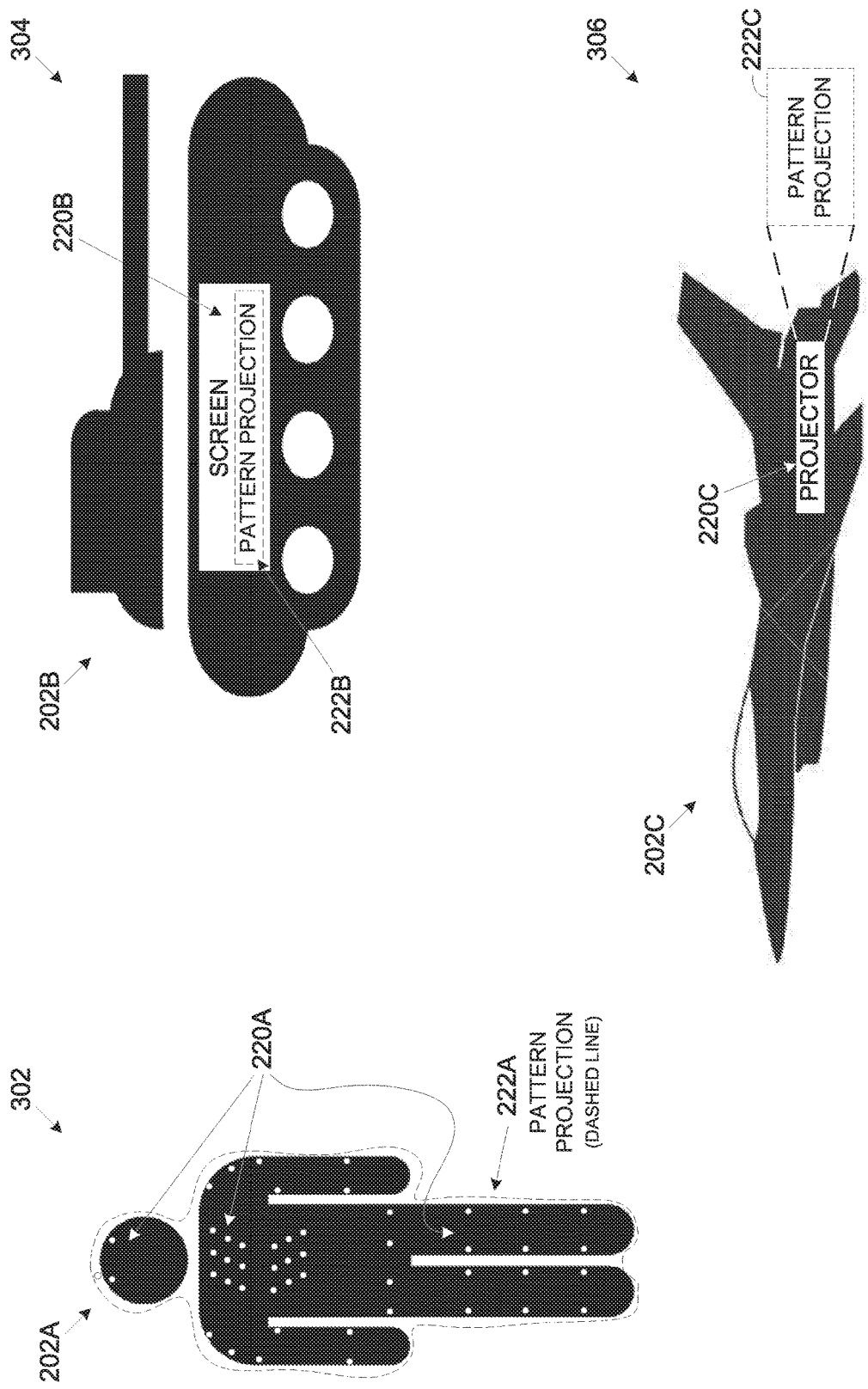
FIG. 3 is a schematic illustration of exemplary light sources configured to project patterns generated to manipulate perception of visual detection systems, according to some embodiments of the present invention.

Reference is now made to FIG. 3, which is a schematic illustration of exemplary light sources configured to project patterns generated to manipulate perception of visual detection systems, according to some embodiments of the present invention. As stated herein before, one or more light sources such as the light source 220 may be configured to project one or more pattern projections on, around, in front and/or in association with one or more of the objects. The light source 220 may employ one or more pattern projection technologies and/or techniques.

For example, the light source 220 may include a plurality of distinct spot light sources distributed over one or more objects such as the object 202. For example, as shown at 302, a plurality of distinct spot light sources 220A may be distributed over a person object 202A, for example, as wearable devices, embedded in clothes of the person 202A and/or the like. The plurality of distinct spot light sources may be operated to form one or more pattern projections 222A over the person 202A and/or part thereof. The plurality of distinct spot light sources 220A may be distributed in one or more distribution patterns. For example, multiple distinct spot light sources 220A may be distributed, worn and/or mounted on the person 202A to outline a figure perimeter of the person 202A. In another example, multiple distinct spot light sources 220A may be distributed, worn and/or mounted on a chest and/or a back of the person 202A to create a light grid.

In another example, the light source 220 may include one or more screens mounted, deployed and/or attached to one or more of the object 202. Each screen may be operated to display one or more patterns (pattern projections). For example, as shown at 304, a screen 220B may be mounted on a vehicle object, for example, a military vehicle such as, for example, a tank object 202B. The screen 220B may be operated to display one or more pattern projections 222B on the tank object 202B and/or part thereof.

In another example, the light source 220 may include one or more projectors, for example, a hologram projector mounted, deployed, attached and/or associated with one or more of the object 202. Each projector may be operated to project one or more pattern projections. For example, as shown at 306, a projector 220C may be mounted on a vehicle object, for example an aerial vehicle such as, for example an aircraft object 202C. The projector 220C may be operated to project one or more pattern projections 222B on, around, in front, behind and/or to a side of the aircraft object 202C.

The pattern generation system 200 and/or the light source(s) 220 associated with the object 202 may typically be mounted on the object 202. However, the system 200 and/or the light source(s) 220 may not be directly mounted on the object 202 but rather deployed to project the pattern(s) 222 in association with the object 202.

Figure 4A:
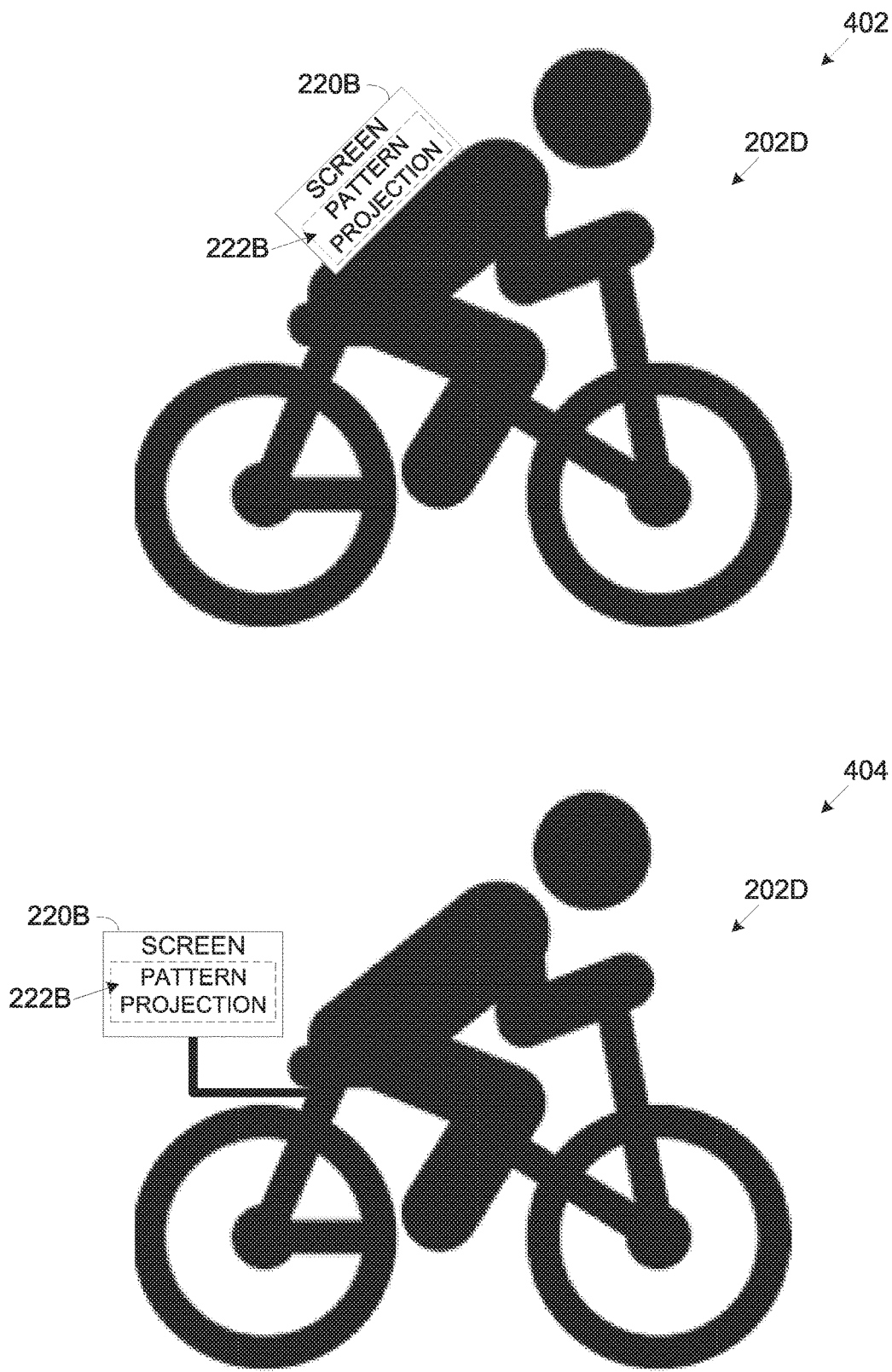
FIG. 4A and FIG. 4B present schematic illustrations of exemplary deployments of light sources configured to project patterns generated to manipulate perception of visual detection systems, according to some embodiments of the present invention.
Figure 4B:
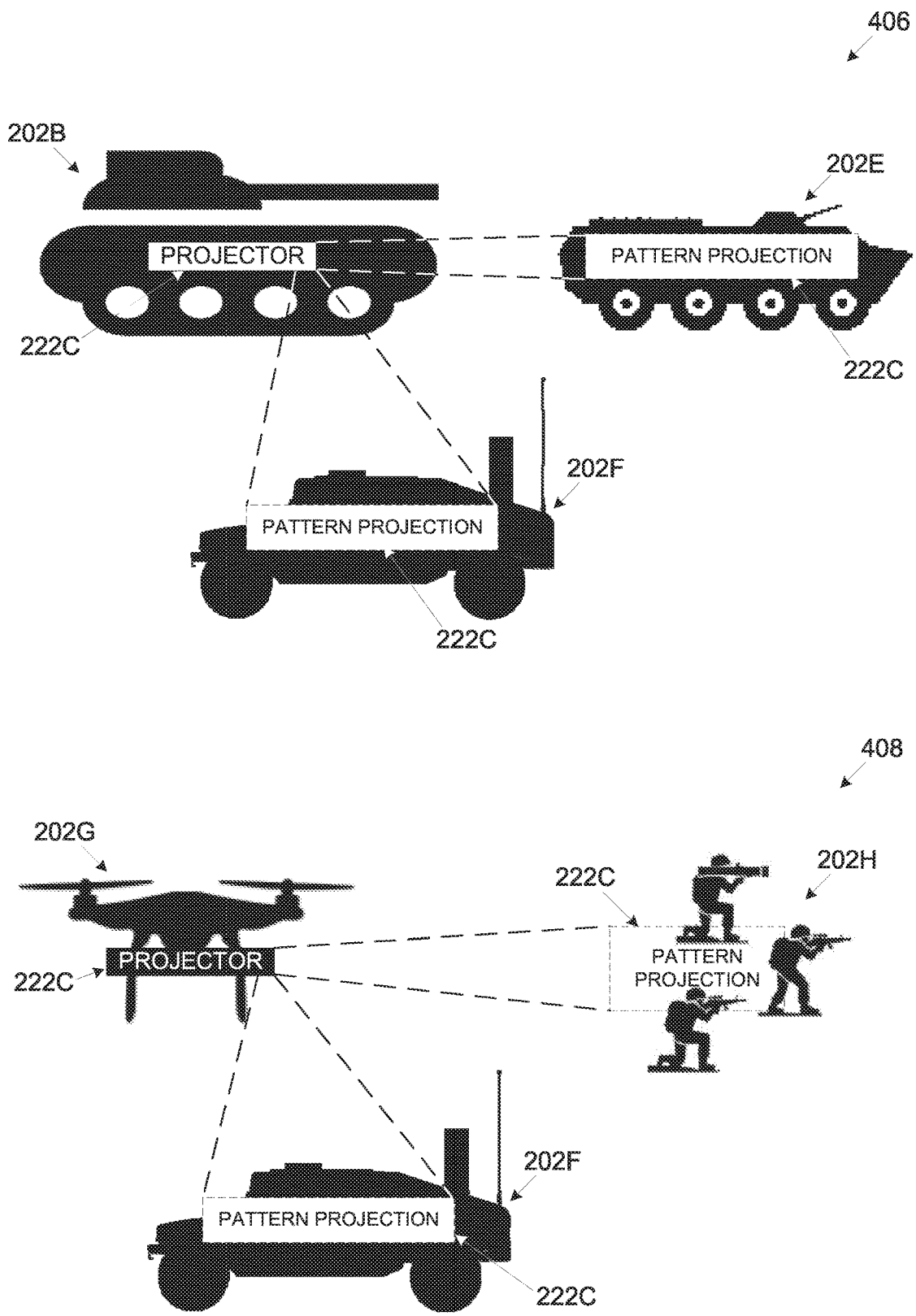

Reference is now made to FIG. 4A and FIG. 4B, which present schematic illustrations of exemplary deployments of light sources configured to project patterns generated to manipulate perception of visual detection systems, according to some embodiments of the present invention. One or more light sources such as the light sources 220, for example, a screen such as the screen 220B may be deployed and operated to project one or more pattern projections such as the pattern projection 222B in association with one or more objects such as the object 202.

For example, as shown at 402, the screen 220B may be mounted on and/or carried by the bicycle rider 202D using one or more methods and/or techniques. For example, the screen 220B may be carried by the bicycle rider 202D, for example, as a backpack. In another example, the screen 220B may be integrated in a backpack carried and/or a wearable device worn by the bicycle rider 202D. In another example, the screen 220B may be integrated and/or embedded in a piece of clothing and/or a garment worn by the bicycle rider 202D, for example, a jacket, a coat, a shirt and/or the like.

However, as shown at 404, the screen 220B associated with the bicycle rider 202D may not be directly mounted on and/or carried by the bicycle rider 202D but may be rather mounted on the bicycle of the bicycle rider 202D and configured to project the pattern projection(s) in association with the bicycle rider 202D, for example, in front, behind, to a side and/or the like of the bicycle rider 202D.

In another example, as shown at 406, one or more light sources 220, for example, a projector 220C may be deployed, mounted and/or installed in a certain object 202, for example, a tank such as the tank 202B to project one or more pattern projections in association with one or more other objects 202, for example, a troops carrier vehicle 202E, a reconnaissance vehicle 202F and/or the like. The light source 220, in this example the projector 220C may therefore not necessarily be mounted on the object 202 (e.g. carrier vehicle 202EE, vehicle 202F) on which the patterns are projected.

In another example, as shown at 408, one or more light sources 220, for example, a projector 220C may be deployed, mounted and/or installed in a certain object 202, for example, a drone 202G to project one or more pattern projections in association with one or more other objects 202, for example, a group of ground troops 202H, the reconnaissance vehicle 202F and/or the like. As demonstrated again in this exemplary deployment of the light source 220 such as, for example, the projector 220C may be done on an object 202 (drone 202G) other than the object 202 (e.g. troops 202H, vehicle 202F) on which the patterns are projected.

Figure 5A:
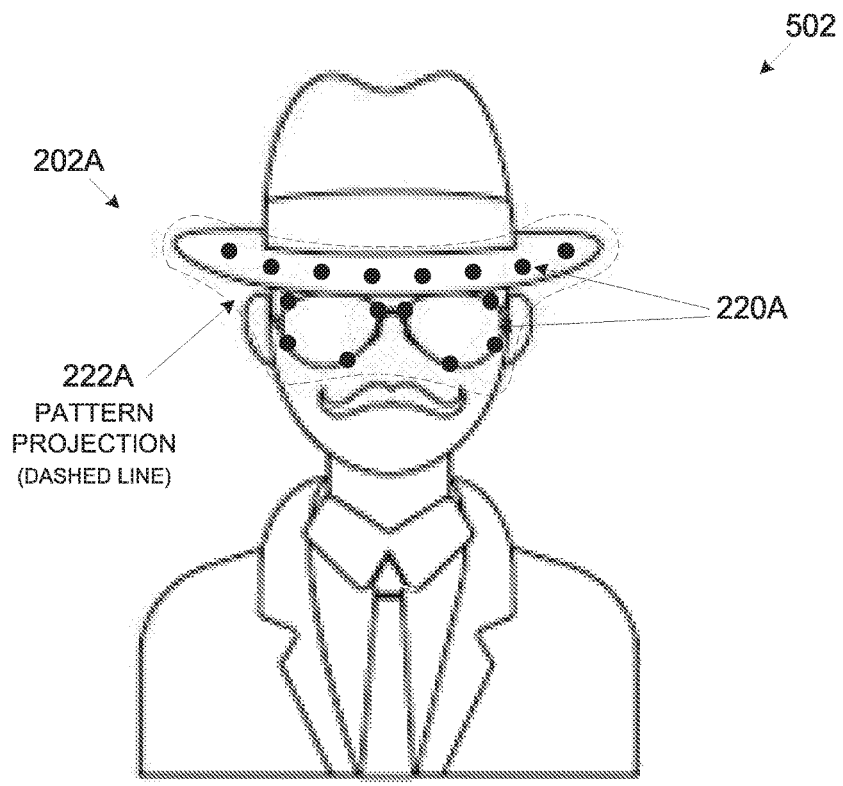
FIG. 5A and FIG. 5B present schematic illustrations of exemplary light sources deployed and configured to project patterns on a face of a person to manipulate perception of visual detection systems, according to some embodiments of the present invention.
Figure 5A:
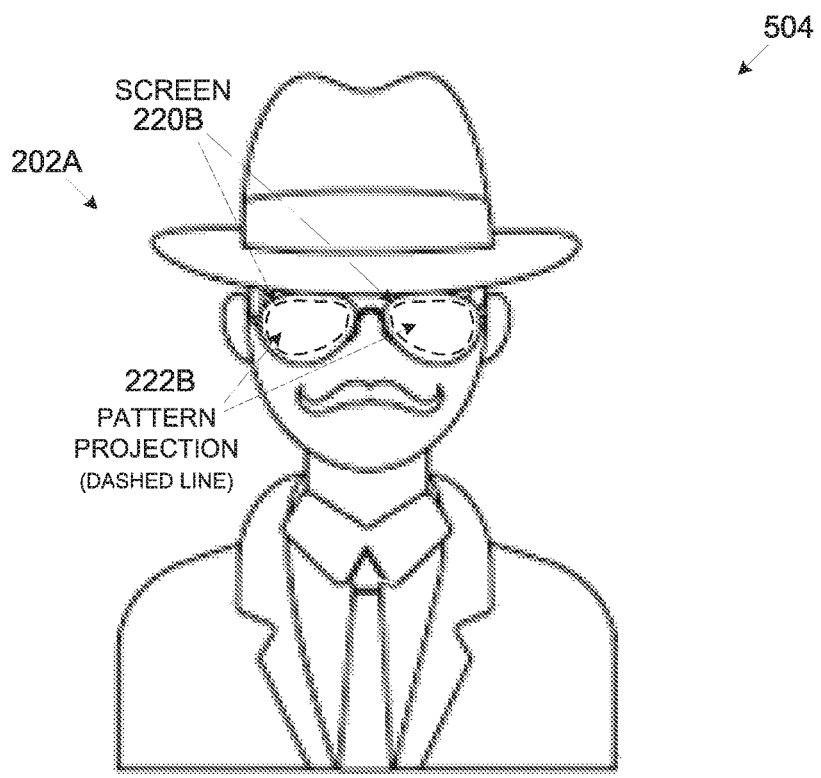
Figure 5B:
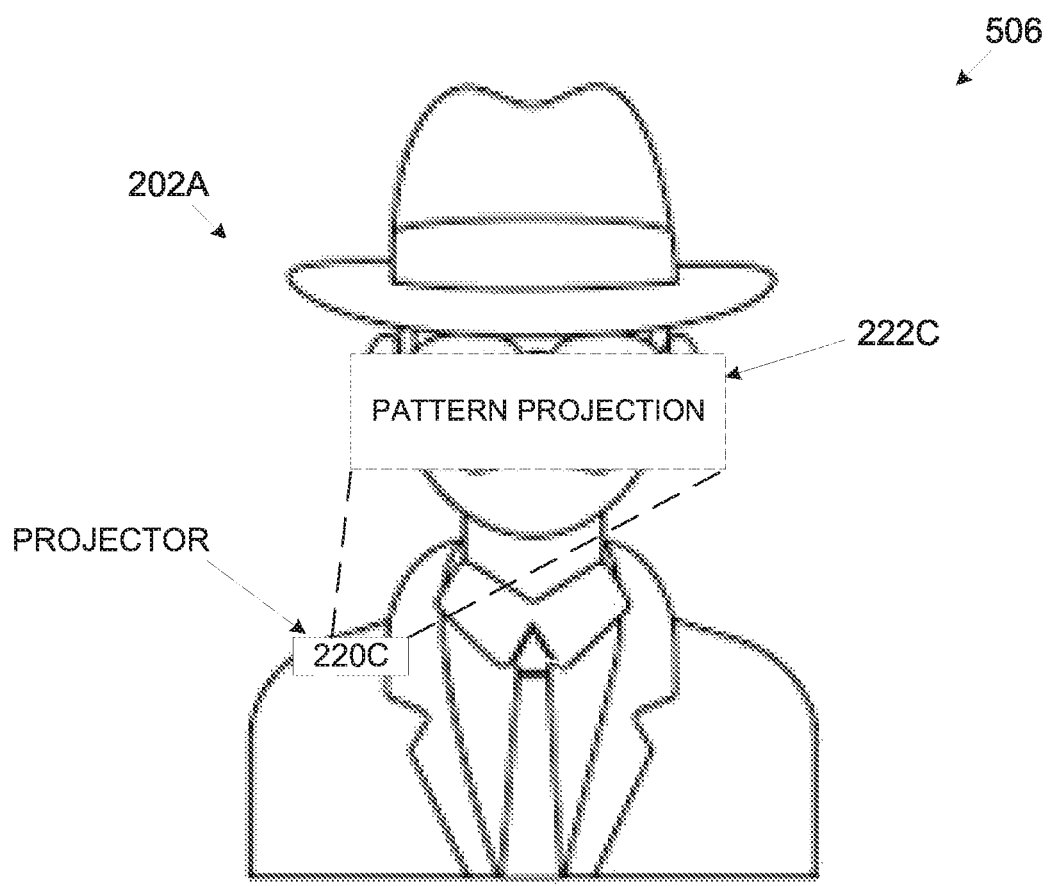

According to some embodiments of the present invention the light source(s) 220 may be deployed and configured to project one or more patterns (pattern projections) on a face of a person to manipulate perception of visual detection systems. Reference is now made to FIG. 5A and FIG. 5B, which present schematic illustrations of exemplary light sources deployed and configured to project patterns on a face of a person to manipulate perception of visual detection systems, according to some embodiments of the present invention.

One or more light sources such as the light source 220 may be deployed and configured to generate one or more pattern projections such as the pattern projection 222 on, around, in front and/or in association with a face of a human person object such as the person 202A to manipulate perception of visual detection systems targeting the face of the person 202A. These light sources 220 may employ one or more pattern projection technologies and/or techniques.

For example, the light source 220 may include a plurality of distinct spot light sources such as the distinct spot light sources 220A distributed, integrated, embedded, mounted and/or attached to the person 202A and/or to one or more pieces of cloth, garments, accessories and/or the like worn by the person 202A. For example, as shown at 502, a plurality of distinct spot light sources 220A may be integrated, embedded and/or attached to a hat worn by the person 202A. In another example, the plurality of distinct spot light sources 220A may be integrated, embedded and/or attached to glasses and/or goggles worn by the person 202A. The plurality of distinct spot light sources may be operated to form one or more pattern projections 222A over the face of the person 202A and/or part thereof.

In another example, the light source 220 may include one or more screens such as screen 220B distributed, integrated, embedded, mounted and/or attached to the person 202A and/or to one or more pieces of cloth, garments, accessories and/or the like worn by the person 202A. For example, as shown at 504, a screen 220B may be integrated in one or both glasses of a pair of glasses and/or goggles worn by the person 202A. Each of the screen(s) 220B may be operated to display one or more pattern projections 222A.

In another example, the light source 220 may include one or more projectors such as the projector 220C, for example, a hologram projector mounted, distributed, integrated, embedded, mounted and/or attached to the person 202A and/or to one or more pieces of cloth, garments, accessories and/or the like worn by the person 202A. Each projector may be operated to project one or more pattern projections. For example, as shown at 506, a projector 220C may be attached to a shoulder strap of a shirt, a coat, a jacket and/or the like worn by the person 202A. The projector 220C may be operated to project one or more pattern projections 222B on, around, in front and/or to a side of the face of the person 202A.

Reference is made once again to FIG. 1A.

As stated herein before, the process 100A conducted by the pattern generator 212 executed by the pattern generation system 200 is directed to generate and project one or more adversarial patterns configured to disorient one or more machine learning models employed by one or more detection systems, in particular visual detection systems. The pattern generation system 200 is associated with one or more of the objects 202 and thus creates the adversarial pattern(s) accordingly.

As shown at 102, the process 100A starts with the pattern generator 212 generating one or more adversarial patterns configured to disorient one or more machine learning models employed by one or more detection systems, in particular visual detection systems which are adapted to detect and identify the associated object(s) 202.

For example, one or more of the detection systems may be used as acquisition systems, in particular visual acquisition systems by one or more weapon systems, for example, a weapon projectile (etc. guided missile, guided rocket, guided shell, etc.), a laser system and/or the like. The machine learning model employed by such acquisition systems may typically be trained to detect and/or identify one or more military objects 202, for example, a soldier, a military vehicle, a military structure, a strategic valuable structure and/or the like. The military vehicles may include, for example, ground vehicles (e.g. tank, troops carrier, command vehicle, etc.), aerial vehicles (e.g. aircraft, drone, satellite, etc.), naval vehicle (e.g. boat, ship, submarine, etc.) and/or the like. The military structures may include, for example, bonkers, military facilities and/or the like. The strategic valuable structure may include, for example, military and/or civilian facilities and/or infrastructures relating to one or more strategic valuable and/or critical aspects and domains, for example, energy, transportation, communication and/or the like.

The pattern generator 212 executed by the pattern generation system 200 which may be associated with one or more of the military objects 202 may therefore generate one or more adversarial patterns as known in the art to obscure a shape and/or appearance of the associated object 202. The generated adversarial pattern(s) are configured to disorient the machine learning model(s) employed by the acquisition system(s) in order to prevent the acquisition system(s) from acquiring and/or locking on the military object(s) 202 associated (protected) with the pattern generation system 200.

In another example, one or more of the detection systems may be used to detect one or more persons 202A, for example, a face recognition system, a tracking system and/or the like. The machine learning model employed by such detection systems may typically be trained to identify one or more types, categories, groups and/or segments of populations of persons (people) 202A. For example, these machine learning model may be trained to identify ethnic groups, segments of persons 202A having common physical features (e.g. height, hair color, eye color, clothing, etc.). Moreover, some of these detection systems may be trained, learned and deployed to identify one or more specific person(s) 202A, for example, based on face recognition.

The pattern generator 212 executed by the pattern generation system 200 which may be associated with one or more of the persons 202A may therefore generate one or more adversarial patterns as known in the art. The generated adversarial pattern(s) are configured to disorient the machine learning model(s) employed by the visual detection system(s) in order to prevent the detection system(s) from detecting the persons 202A associated (protected) with the pattern generation system 200.

As shown at 104, the pattern generator 212 may operate one or more of the light sources 220 to project on the associated object(s) 202 one or more pattern projections 222 of the generated adversarial pattern(s) in attempt to disorient the machine learning model(s) of the visual detection system(s) targeting the object 202 and prevent detection of the associated object(s) 202 by the detection system(s).

The pattern generator 212 may operate the light source(s) 220 to project the adversarial pattern presentation(s) on, around, in front, behind, to a side and/or in association with one or more of the objects 202 thus preventing the detection system from detecting and/or acquiring the associated object(s) 202, in particular object(s) 202 which the machine learning model(s) is trained to detect and identify.

For example, the pattern generator 212 may operate one or more screens such as the screen 220B mounted on a tank object such as the tank 202B. The pattern generator 212 may operate the screen(s) 220B to present (display) one or more adversarial pattern presentations 222B configured to obscure the shape and/or appearance of the tank 202B in attempt to prevent the acquisition system from detecting and/or locking on the tank 202B.

In another example, the pattern generator 212 may operate one or more projectors such as the projector 220C mounted on an aircraft object such as the aircraft 202C. The pattern generator 212 may operate projector(s) 220C to project one or more holographic adversarial pattern(s) 222C configured to obscure the shape and/or appearance of the tank 202B in attempt to prevent the acquisition system from detecting and/or locking on the aircraft 202C.

In another example, the pattern generator 212 may operate a plurality of district spot light sources such as the distinct spot light sources 220A distributed in association with the face of a person object such as the person 202A as shown at 502. The pattern generator 212 may operate at least some of the distinct spot light sources 220A to form one or more adversarial pattern presentations 222A configured to obscure the shape and/or appearance of the face in attempt to prevent the detection system from detecting and/or identifying the face of the person 202A. In another example, the pattern generator 212 may operate the screen(s) 220B as shown at 504 to display one or more of the adversarial pattern presentations 222B which may prevent the detection system from detecting and/or identifying the face of the person 202A. In another example, the pattern generator 212 may operate the projector 220C as shown at 506 to project one or more of the adversarial pattern presentations 222C in front of the face of the person 202A which may prevent the detection system from detecting and/or identifying the face of the person 202A.

The pattern generator 212 may be constantly active and operational such that it may continuously generate the adversarial pattern(s) and operate one or more of the light source(s) 220 to project the adversarial pattern projection(s) 222. However, in order to preserve power and reduce power consumption of the pattern generation system 200 and/or of the light source(s) 220, the pattern generator 212 may be activated to start operating in response to one or more events while typically powered down.

For example, assuming the pattern generation system 200 is associated, mounted and/or used by a military vehicle such as the tank 202B, the aircraft 202C and/or the like. In such case, the pattern generator 212 may be activated in response to an indication of an incoming weapon projectile, for example, guided missile, rocket and/or the like. In another example, assuming the pattern generation system 200 is associated, mounted and/or used by a military vehicle such as the tank 202B, the aircraft 202C and/or the like. In such case, the pattern generator 212 may be activated in response to an indication of a lock detection of a laser system.

In another example, assuming the pattern generation system 200 is associated with a certain person 202A to prevent face recognition of the person 202A. In such case, the pattern generator 212 may be activated when the person 202A enters one or more areas in which face recognition systems are deployed, for example, an airport, a train station, a shopping mall, an entertainment center and/or the like. However while travelling through non-urban areas the pattern generation system 200 and/or the pattern generator 212 may be powered down.

As stated herein before, the process 100B conducted by the pattern generator 212 executed by the pattern generation system 200 is directed to generate and project one or more patterns configured to enhance detection of one or more of the objects 202 by one or more machine learning based detection systems, in particular visual detection systems. The pattern generation system 200 is associated with one or more of the objects 202 and thus creates the pattern(s) accordingly.

As shown at 112, the process 100B starts with the pattern generator 212 generating one or more patterns configured to enhance detection of the associated object(s) 202 by one or more machine learning models employed by one or more detection systems, in particular visual detection systems which are adapted to detect and identify the associated object(s) 202.

For example, one or more of the detection systems, in particular visual detection systems may be mounted, integrated and/or used by one or more autonomous and/or partially autonomous vehicles to detect objects in the environment of the vehicle. The machine learning model employed by such visual detection systems may typically be trained to detect and/or identify one or more objects 202 which may appear in the vehicle's environment, for example, another vehicle, a pedestrian, a road infrastructure object (e.g. traffic light, traffic sign, road markings, a sidewalk edge, etc.) and/or the like.

The pattern generator 212 executed by the pattern generation system 200 may be thus associated with one or more of the objects 202 that may appear in the environment of the at least partially autonomous vehicle. The pattern generator 212 may generate one or more patterns which are configured to enhance detection of the associated objet(s) 202 by the machine learning model(s) employed by the detection system of the at least partially autonomous vehicle.

For example, assuming the pattern generation system 200 and the light source(s) 220, for example, the screen 220B are attached and/or carried by a bicycle rider such as the bicycle rider 202D as shown at 402. In such case the pattern generator 212 may generate one or more patterns of a person riding bicycles. In another example, the pattern generator 212 may generate one or more vehicle patterns, for example, a car pattern and/or the like.

As shown at 114, the pattern generator 212 may operate one or more of the light sources 220 to project on, around, in front, behind, to a side and/or in association with the associated object(s) 202 one or more pattern projections 222 of the generated pattern(s) in attempt to enhance detection of the object(s) 202 by the machine learning model(s) of the visual detection system(s) targeting the object 202.

To continue the previously presented example of the bicycle rider 202D, the pattern generator 212 may operate the screen 220B carried and/or attached to the bicycle rider 202D as shown at 402. The pattern generator 212 may operate the screen 220B to present (display) the pattern presentation 222B of the person riding bicycles to improve probability that the machine learning model based detection system of the at least partially autonomous vehicle correctly detects the bicycle rider 202D as such, i.e. as bicycle rider. Additionally and/or alternatively, the pattern generator 212 may operate the screen 220B to present (display) the pattern presentation 222B of the car thus leading the machine learning model based detection system of the at least partially autonomous vehicle to detect the bicycle rider 202D as a car and take actions accordingly, in particular keeping safe distance from the bicycle rider 202D.

As described for the process 100A, the pattern generator 212 may be constantly active and operational or it may be activated in response to one or more events while typically powered down. For example, assuming the pattern generation system 200 is associated with the bicycle rider 202D. In case the bicycle rider 202D is riding his bicycles in a park where no vehicles are allowed to enter, the pattern generation system 200 and/or the particular the pattern generator 212 indicated accordingly and may power down, for example, enter standby mode and/or power saving mode. However, once the bicycle rider 202D exits the park and rides into a road, the pattern generator 212 may be activated to generate the pattern(s) and operate the screen 220B to project pattern projections 222B of the generated patterns.

As stated herein before, the process 100C conducted by the pattern generator 212 executed by the pattern generation system 200 associated with a certain object 202 is directed to generate and project one or more dynamic patterns which are configured, adapted and/or designed to alter one or more focal points of the pattern(s). The dynamic patterns may be project on at least part of the associated object 202 in order to prevent one or more auto-focus algorithms employed by camera(s) to focus on the dynamic pattern(s) and thus from focusing on the associated object 202.

As shown at 112, the process 100B starts with the pattern generator 212 generating one or more dynamic patterns configured to alter the focal point(s) of the pattern(s), for example, by dynamically and constantly changing a depth of the dynamic pattern(s) in order to prevent the auto-focus algorithms from focusing on the dynamic pattern(s).

As shown at 114, the pattern generator 212 may operate one or more of the light sources 220 to project on, around, in front, behind, to a side and/or in association with the associated object 202 one or more pattern projections 222 of the generated dynamic pattern(s) having a constantly changing depth and thus changing focal point. Projecting the dynamic pattern(s) may thus prevent the auto-focus algorithm(s) of camera(s) targeting the associated object 202 from focusing on the associated object 202.

For example, the pattern generation system 200 and one or more light sources 220, for example, the screen 220B may be associated, for example, worn and/or carried by one or more persons such as the person 202A, for example, a celebrity. The pattern generator 212 may operate the screen 220B to project one or more of the dynamic patterns in which the focal point(s) are constantly altered to constantly change depth of the dynamic pattern(s). As such camera employing auto-focus algorithms which attempt to capture the person 202A may fail to properly focus on the dynamic pattern(s) projections 222B projected on the person 202A and thus fail to focus on the person 202A and naturally fail to properly capture quality images of the person 202A.

As described for the processes 100A and 100B, the pattern generator 212 may be constantly active and operational or it may be activated in response to one or more events while typically powered down.

It is expected that during the life of a patent maturing from this application many relevant systems, methods and computer programs will be developed and the scope of the terms machine learning models and adversarial patterns are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of operating at least one light source to project adversarial patterns generated to disorient a machine learning based detection system, comprising:
   using at least one processor associated with an object targeted by the machine learning based detection system, the at least one processor is used for:
      generating at least one adversarial pattern configured to disorient the machine learning based detection system; and
      operating the at least one light source configured to project the at least one adversarial pattern in association with the targeted object in order to disorient the machine learning based detection system,
   wherein the machine learning based detection system is a machine learning based acquisition system of an incoming weapon projectile targeting the object, the at least one adversarial pattern is configured to disorient the machine learning based acquisition system in order to prevent the incoming weapon projectile from locking on the targeted object.

2. The method of claim 1, wherein the at least one light source includes a plurality of distinct spot light sources distributed over the targeted object.

3. The method of claim 1, wherein the at least one light source includes a screen.

4. The method of claim 1, wherein the at least one light source includes a hologram projector.

5. The method of claim 1, wherein the at least one light source is mounted on the object.

6. The method of claim 1, wherein the targeted object is a member of a group consisting of: a person, a ground vehicle, an aerial vehicle, a naval vehicle and a structure.

7. The method of claim 1, wherein the machine learning based detection system is a machine learning based face recognition system attempting to identify a face of a human object, the at least one adversarial pattern is configured to disorient the machine learning based face recognition system in order to prevent identification of the human object.

8. A system for operating at least one light source to project adversarial patterns generated to disorient a machine learning based detection system, comprising:
   the at least one light source configured to project patterns in association with an object targeted by the machine learning based detection system;
   at least one processor associated with the object and coupled to the at least one light source, the at least one processor is adapted to execute a code, the code comprising:

code instructions to generate at least one adversarial pattern configured to disorient the machine learning based detection system, and code instructions to operate the at least one light source to project the at least one adversarial pattern in association with the object in order to disorient the machine learning based detection system targeting the object, wherein the machine learning based detection system is a machine learning based acquisition system of an incoming weapon projectile targeting the object, the at least one adversarial pattern is configured to disorient the machine learning based acquisition system in order to prevent the incoming weapon projectile from locking on the targeted object.

* * * * *